(12) United States Patent
Chen

(10) Patent No.: US 11,153,381 B2
(45) Date of Patent: Oct. 19, 2021

(54) DATA AUDITING FOR OBJECT STORAGE PUBLIC CLOUDS

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 824 days.

(21) Appl. No.: 15/683,321

(22) Filed: Aug. 22, 2017

(65) Prior Publication Data

US 2019/0068706 A1  Feb. 28, 2019

(51) Int. Cl.
*H04L 29/08* (2006.01)
*G06F 16/23* (2019.01)

(52) U.S. Cl.
CPC ...... *H04L 67/1097* (2013.01); *G06F 16/2365* (2019.01); *H04L 67/28* (2013.01); *H04L 67/2809* (2013.01); *H04L 67/2819* (2013.01)

(58) Field of Classification Search
CPC ..... H04L 63/105; H04L 63/08; H04L 63/107; H04L 67/42; G06F 3/0667; G06F 3/064
See application file for complete search history.

(56) References Cited

U.S. PATENT DOCUMENTS

| | | | | |
|---|---|---|---|---|
| 8,988,998 B2 * | 3/2015 | Adam | ................... | G06F 15/173 370/230 |
| 9,009,697 B2 * | 4/2015 | Breiter | .................. | G06F 9/5072 717/120 |
| 9,128,773 B2 * | 9/2015 | Beaty | .................... | G06F 9/5083 |
| 9,357,331 B2 | 5/2016 | Huang | | |
| 9,473,374 B2 * | 10/2016 | Beaty | .................... | G06F 9/5072 |
| 9,537,650 B2 | 1/2017 | Auradkar et al. | | |
| 9,575,841 B2 | 2/2017 | Mason, Jr. et al. | | |
| 10,795,812 B1 * | 10/2020 | Duggal | ................ | G06F 16/182 |
| 2012/0151551 A1 * | 6/2012 | Readshaw | ............ | H04L 63/104 726/1 |
| 2012/0204187 A1 * | 8/2012 | Breiter | .................. | G06F 9/5072 718/105 |
| 2012/0246202 A1 * | 9/2012 | Surtani | ................ | G06F 16/289 707/812 |
| 2012/0258777 A1 * | 10/2012 | Huang | ................... | H04W 4/60 455/557 |

(Continued)

OTHER PUBLICATIONS

How to Configure Encryption for Amazon S3; https://www.cloudera.com/documentation/enterprise/latest/topics/sg_aws_s3_encryption.html; , generated Jul. 26, 2017; pp. 1-5.

(Continued)

*Primary Examiner* — Hitesh Patel
(74) *Attorney, Agent, or Firm* — K&L Gates LLP

(57) ABSTRACT

A method for data auditing for object storage public clouds includes a service broker receiving a request to store data in public object storage, where the request includes user information or a container image. The service broker, based on either the user information or the container image, determines that data auditing is necessary. The service broker creates a storage unit, in public object storage, and a storage proxy. The method further includes the storage proxy storing data, and a data auditor retrieving data from the storage proxy. The data auditor determines a data qualification for the data, and notifies the storage proxy of the data qualification.

20 Claims, 6 Drawing Sheets

(56) References Cited

U.S. PATENT DOCUMENTS

| | | | |
|---|---|---|---|
| 2013/0091106 A1* | 4/2013 | Dubbels | G06F 16/27 |
| | | | 707/694 |
| 2014/0053280 A1* | 2/2014 | Durazzo | H04L 63/0281 |
| | | | 726/28 |
| 2014/0108639 A1* | 4/2014 | Nelke | H04L 41/5051 |
| | | | 709/224 |
| 2015/0019858 A1* | 1/2015 | Roth | H04L 63/20 |
| | | | 713/150 |
| 2015/0295824 A1* | 10/2015 | Chopra | G06F 9/45558 |
| | | | 709/223 |
| 2016/0196324 A1 | 7/2016 | Haviv et al. | |
| 2016/0371134 A1* | 12/2016 | Raghavendra | G06F 11/3055 |
| 2017/0041296 A1* | 2/2017 | Ford | G06F 16/951 |
| 2017/0185793 A1 | 6/2017 | Rotem et al. | |
| 2018/0129665 A1* | 5/2018 | Bach | G06F 16/13 |
| 2019/0377656 A1* | 12/2019 | Choe | G06F 11/3495 |

OTHER PUBLICATIONS

Configure Object Storage with the S3 API; https://docs.openstack.org/kilo/configreference/content/configuring-openstack-object-storage-with-s3_api.html; retrieved Jul. 31, 2017; pp. 1-2.

Codedellemc/Ecs-Cf-Service-Broker: Cloud Foundry Service Broker for EMC ECS Object Storage; https://github.com/codedellemc/ecs-cf-service-broker; retrieved Jul. 31, 2017; pp. 1-6.

Object Storage I NeCTAR Support; https://web.archive.org/web/20170217082940/http://support.rc.nectar.org.au/docs/object-storage; retrieved Aug. 22, 2017 (4 pages).

* cited by examiner

DATA AUDITING FOR OBJECT STORAGE PUBLIC CLOUDS

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Characteristics of the cloud computing model include on-demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

Cloud infrastructure is a collection of hardware and software that implements the cloud computing model. Cloud infrastructure may be viewed as including a physical layer and an abstraction layer. The physical layer includes hardware resources designed to support the cloud services being provided, and typically includes a variety of server, storage, and network components. The abstraction layer may include the software deployed across the physical layer, which manifests the cloud characteristics. Conceptually, the abstraction layer resides above the physical layer. Cloud storage is a data storage service that provides storage to users in the form of a virtualized storage device over a network. Using cloud storage service, users may store, retrieve, maintain, and back up data remotely.

SUMMARY

The present disclosure provides new and innovative methods and systems for data auditing for object storage public clouds. An example method includes a service broker receiving a request to store data in public object storage, where the request includes user information or a container image. The service broker, based on either the user information or the container image, determines that data auditing is necessary. The service broker creates a storage unit, in public object storage, and a storage proxy. The method further includes the storage proxy storing data, and a data auditor retrieving data from the storage proxy. The data auditor determines a data qualification for the data, and notifies the storage proxy of the data qualification.

An example system includes one or more processors, a storage unit, a storage proxy, a data auditor, and a service broker. The service broker executes on the one or more processors, and is configured to receive a request to store data in public object storage, where the request includes user information or a container image. The service broker determines that data auditing is necessary based on the user information or the container image and creates a storage unit, in public object storage, and a storage proxy. The storage proxy stores the data. The data auditor retrieves the data from the storage proxy, determines a data qualification for the data, and notifies the storage proxy of the data qualification.

Additional features and advantages of the disclosed methods and system are described in, and will be apparent from, the following Detailed Description and the Figures.

DETAILED DESCRIPTION OF EXAMPLE EMBODIMENTS

Figure 1:
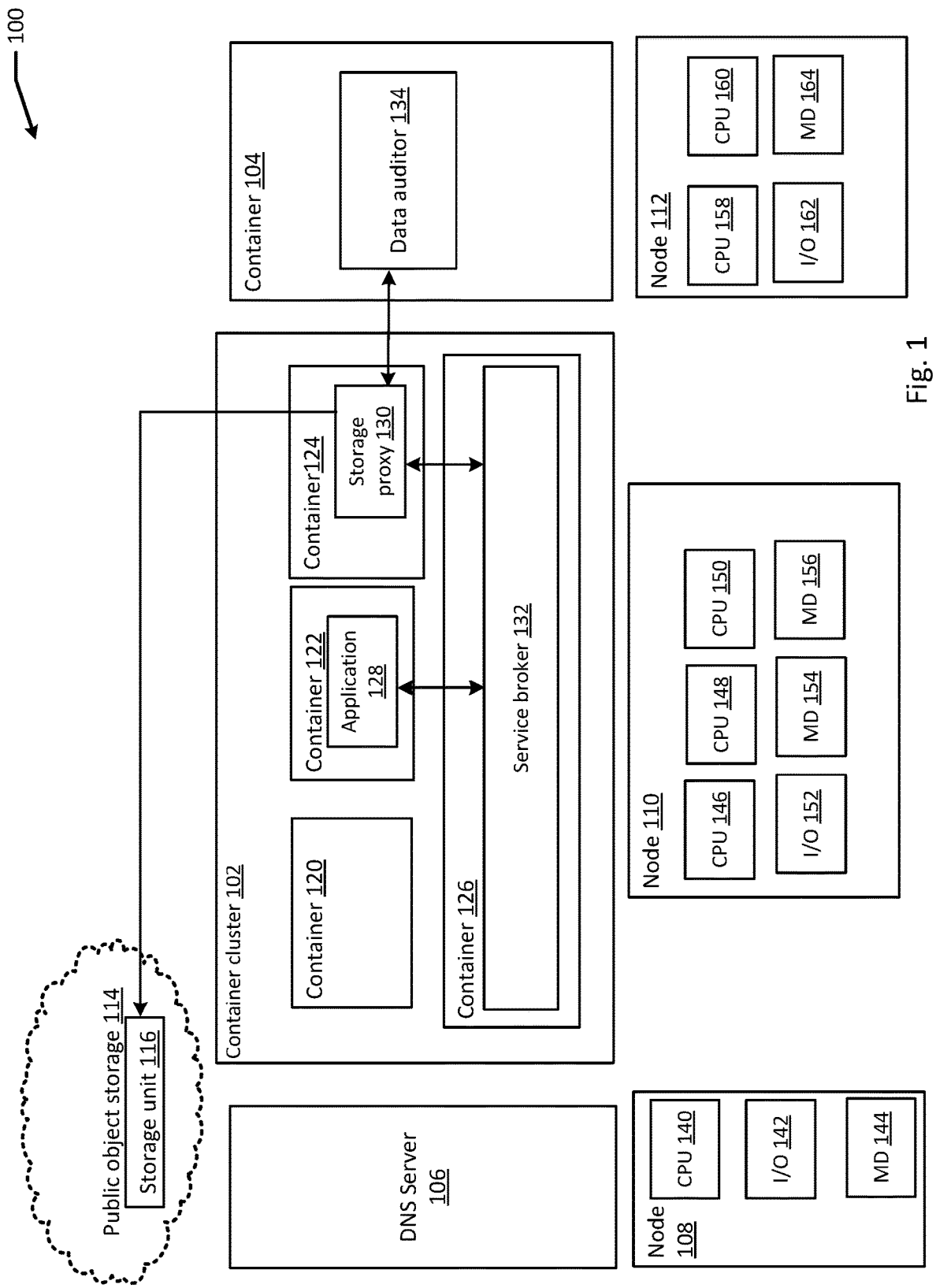
FIG. 1 is a block diagram of an example public storage system according to an example of the present disclosure.

Cloud storage can be either public or private. Private cloud storage is more secure, as it is usually located on site, but more expensive as it requires the enterprise to provide the data center space, network connectivity, power, and cooling capabilities. Maintaining a private infrastructure can be costly and impractical for growing companies. Alternatively, public cloud storage is designed for multi-tenancy and enables enterprises to store data in the cloud and back up their data without having to maintain a storage infrastructure.

Data can be stored onto the cloud in various formats. Block storage is a type of data storage where files are split into evenly sized blocks of data, each block being stored at its own address. However, block storage generally does not include additional information (e.g., metadata) to provide more context for what that block of data is. Generally, block storage is not ideal for data growth. For example, as more data is generated, storage systems have to grow at about the same pace. When an enterprise attempts to expand block-based storage systems by a significant amount, an enterprise may run into durability issues, limitations due to infrastructure, or an increase in management overhead.

Alternatively, object storage is generally a type of cloud based data storage where data is stored in objects, and from the user's perspective, the files are not split up into different blocks of data. Generally, objects are stored in a flat structure, where objects are not organized in a hierarchy and one object is not stored in another object. Typically, each object includes the data to be stored in the object, various metadata, and a globally unique identifier within the object storage system. In some examples, object storage is cheaper than other types of cloud storage, and allows for the retention of massive amounts of unstructured data. Generally, object storage also provides greater possibilities for data analytics, and the ability to store an object anywhere within a distributed data pool. In an example, object storage's flat address space allows it to be easily scaled by adding more storage to the pool.

Generally, object storage is slower than other types of cloud storage because object storage may be rate limited, meaning, for example, it may only be able to process a certain quantity of data at a time. For example, object storage may receive 10,000 requests per second, but may only be able to process 100 requests per second.

Generally, a service broker executes as part of a cloud computing system to send and receive messages, and queue those messages, which helps developers build applications in which independent components work together to accomplish a task. A service broker monitors the completion of tasks, between two different applications, and is responsible for the safe delivery of messages. A service broker may store messages until they are ready for delivery. Generally, a proxy server is a server that acts as an intermediary between an endpoint device and another server from which a user or client is requesting a service. An advantage of a proxy server is that its cache can serve all users. For example, a proxy server may receive a request for a webpage, the proxy server looks in its local cache of previous pages. If the proxy server find the page, it returns it to the user without needing to forward the request to the internet. If the page is not in the cache, the proxy server, uses one of its own IP addresses to request the page from the server out on the internet. When the page is returned, the proxy server relates it to the original request and forwards the page on to the user.

Recently the security of data stored in public cloud storage has drawn public attention. In an example, recent stories have discussed a number of instances where private information placed in public object storage has been wiped, lost, corrupted, or stolen. Typically data stored in public object storage follows the eventual consistency model. Eventual consistency is a consistency model used by public object storage providers to provide high availability of data, where replicas are guaranteed to converge only when the system has been quiesced for a period of time. In eventual consistency, eventually all access to that item will return to the last updated value. However, generally, the eventual consistency model is not reliable for monitoring for data breach. This is because when one server is updated in the eventual consistency model, the updates are not visible on the other servers right away. For example, if data is stored in public object storage in the US by a customer utilizing a US server in a cloud network, a coworker of the US customer based in Tokyo using a Tokyo server in the cloud network monitoring for data breaches will not see the data update on the US server for an extended amount of time until finally the Tokyo server is updated to match the US server. The eventual consistency model makes monitoring data stored on the cloud an unmanageable solution as servers are not updated in a timely manner. Therefore, in an example, if private or sensitive information was put onto the public cloud utilizing the US server, the coworker in Tokyo would find it nearly impossible to notice and catch this data security issue. Due to the rate limits of public object storage, it would also be highly difficult to sort and filter to find private or improper data once it is already stored in public object storage. Further, if the information is caught and deleted from one server, the remaining servers will not be updated right away due to the eventual consistency model, leaving sensitive information exposed even after deletion. Accordingly, a public storage system that prevents private information from being placed onto public object storage is necessary, as it is nearly impossible to discover and remove the data once already loaded onto public object storage. Aspects of the present disclosure address the above noted deficiency by employing data auditing for public object storage clouds.

A service broker reads a request for data to be stored in a storage unit in public object storage and determine whether the data should be audited before being stored in the storage unit. If the service broker determines data should be audited, the service broker provisions, or creates, a storage proxy for temporarily storing the data, as well as a storage unit in public object storage. The service broker directs the data to be sent to the storage proxy. The data is retrieved by a data auditor, which audits the data and determines whether to provide a compliance indication if the data can be stored in the storage unit, or instead to flag the data if the data is not safe to be stored in the storage unit because it contains some type of private information. If the data receives a flag, the data is not stored in the storage unit and the appropriate parties will be notified. If the data is safe to store in the storage unit, the data will be stored in the storage unit located in public object storage. For example, a service broker may determine data containing credit card information should be audited and sends that data to a storage proxy. After an indication, the data is retrieved from the storage proxy by the data auditor, and the data auditor determines whether that information should be stored on the public cloud. If the information contains pin numbers and credit card numbers, the data auditor may flag the information and not store the information in the storage unit.

The systems and methods disclosed herein are inextricably tied to and provide an improvement to computer technology. For example, by adding an additional layer of constraint during the process of placing data onto the public cloud (e.g., determining by a service broker whether data should be audited, and auditing the data by the data auditor to determine if the data is safe to be stored in public object storage), the security of private information is increased before data is stored onto public object storage, reducing the need to continuously monitor rate limited public object storage, that is also unreliable due to the eventual consistency model. The solution described herein is necessarily rooted in computer technology to overcome a problem specifically arising in the realm of computer networks, and more specifically to public object storage rate limits in the field of cloud computing, by addressing the challenge of preventing and filtering the upload of data containing sensitive information in a cloud environment. For example, as described in greater detail below, the service broker filters requests requiring auditing, and dictates to the storage proxy which data should be temporarily stored for auditing by the data auditor. The data auditor designates the data with a data qualification and dictates the storage proxy to respond according to the data qualification. The disclosed system and methods improve computer hardware on which cloud environments exist to allow for the disclosed performance that did not previously exist.

FIG. 1 depicts a high-level component diagram of an example public storage system 100 for different availability and performance requirements. For example, the system 100 may include nodes 108, 110, and 112. Node 108 may include CPU 140, input/output ("I/O") device 142, and memory device 144. Node 110 may include CPUs 146, 148, and 150, I/O device 152, and memory devices 154 and 156. Node 112 may include I/O device 162, memory device 164, and CPUs 158 and 160.

The system 100 may include public object storage 114. The public object storage may include a storage unit 116. Further, the system 100 may include a container cluster 102, a container 104, and a DNS server 106. The container 104 may include a data auditor 134. The container cluster 102 may include containers 120, 122, 124, and 126. The container 122 may include an application 128. The container 124 may include a storage proxy 130. The container 126 may include a service broker 132. In an example, the DNS server 106, the container cluster 102, and the container 104 are all located and running on different nodes.

In an example, the service broker 132 may receive a request from an application 128. The service broker 132, based on the request received, will determine whether the data associated with that request should be audited or reviewed. If the service broker 132 determines the data should be audited, the service broker 132 provisions or creates the storage unit 116 and the storage proxy 130 for the data. The data is then stored in the storage proxy 130. In an example, each time the service broker 132 receives a request from the application 128, the service broker 132 will provision or create a new storage proxy and storage unit, such as storage proxy 130 and storage unit 116. Then, the data is retrieved from the storage proxy 130 by the data auditor 134, and given a data qualification. If the data qualification is a compliance indication or an indication that the data is safe to store in the storage unit 116, the data is stored in the storage unit 116, located in public object storage 114. If the data qualification is a flag, the data is not stored in storage unit 116.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

Further, system 100 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.), for example the I/O 142, 152, and 162, may be coupled to a processor.

Figure 2:
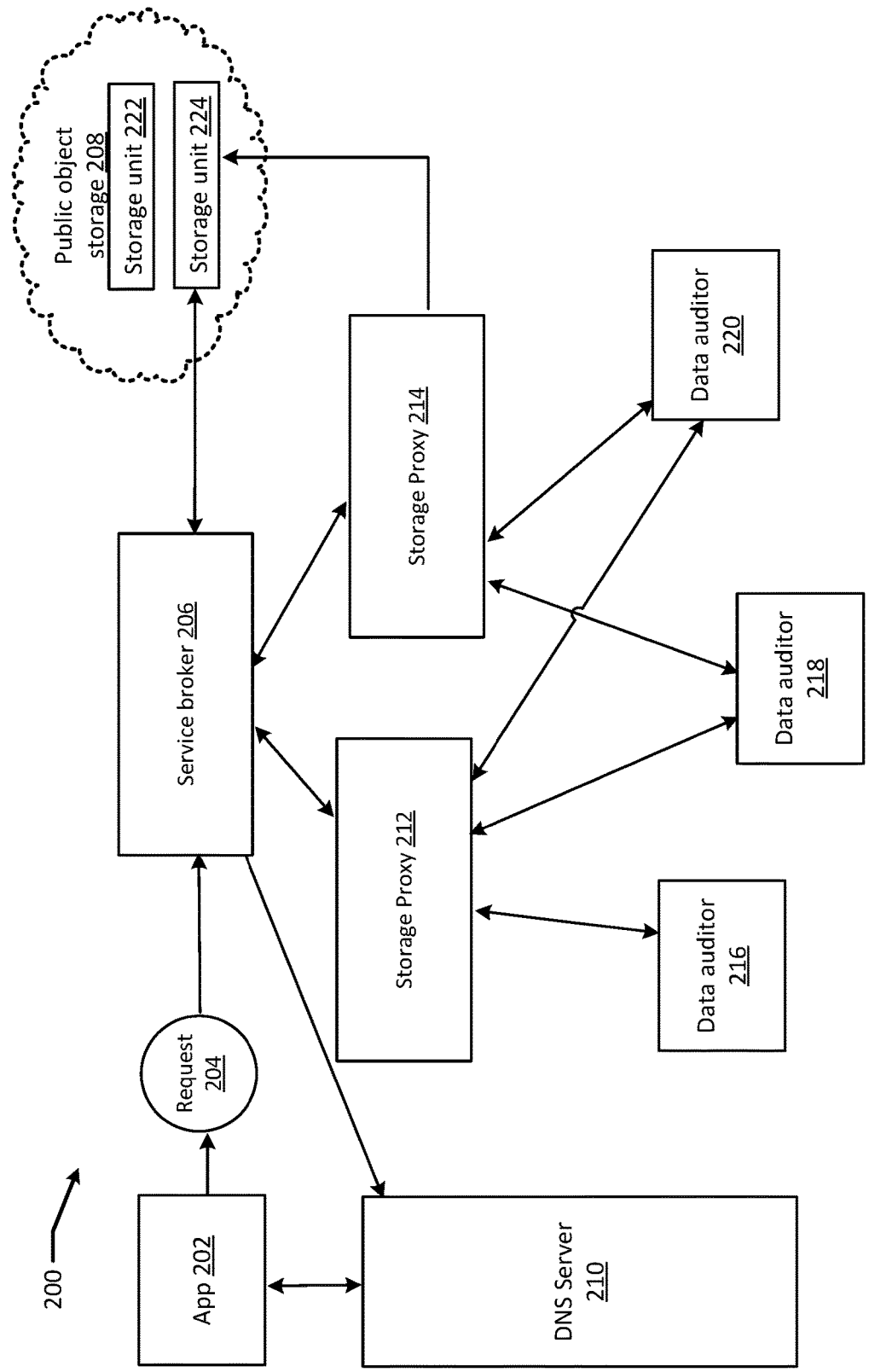
FIG. 2 is a block diagram of an example public storage system according to an example of the present disclosure.

FIG. 2 illustrates a block diagram of an example public storage system. The system 200 may include public object storage 208. Public object storage 208 includes multiple storage units. For example, public object storage 208 may include a storage unit 222 and a storage unit 224. A storage unit can be, for example, a unit of storage similar to an Amazon Web Services S3™ bucket, a Google Cloud™ bucket, or a blob in Azure Blob™ storage by Microsoft®. A storage unit, for example, may be used to group data into one unit.

The system 200 further includes an application 202 that sends a request 204 to a service broker 206 for data to be stored in public object storage 208 by provisioning a storage unit 224 for the data. The request 204 can be sent by a user of the application 202, or can be automatically generated by the application 202. The request 204 may include information about the user or administrator of the application 202, or it may include a container image of the application 202, as an application may typically run in a container. The request is received by the service broker 206. The service broker 206 will read the request 204 including either the user information or the container image and may determine that data auditing is necessary, as there may be sensitive, confidential, or private information located in the data. In this circumstance, the service broker 206 will provision or create a storage unit 224 in public object storage 208 for this data for a later time. Further, service broker 206 will create a storage proxy for this data, such as storage proxies 212 or 214, for the data to be stored in temporarily. In this example, the service broker 206 will provision storage proxy 214 to store the data.

In this example, once the service broker 206 identifies which storage proxy should be provisioned for the request 204, the service broker 206 dictates to a DNS server 210 to change the endpoint for the data to be storage proxy 214, and not storage unit 224 in public object storage 208. In an example, the DNS server 210 may already have the IP addresses corresponding to the endpoints to be changed. However, in an alternative example, the DNS server 210 may not have the IP addresses corresponding to the endpoints to be changed, and therefore, the DNS server 210 will request from application 202 the correct IP addresses corresponding to the endpoints to be changed. Once the DNS server 210 updates the endpoints for the data to be storage proxy 214, the service broker 206 will direct the application 202 to send the data to the storage proxy 214, and will also direct the storage proxy 214 to store the data.

In this example, once the data is stored in the storage proxy 214, a data auditor, such as data auditors 216, 218, or 220 will retrieve the data. The storage proxy 214 will identify which data auditor the data should be sent to because the data will be labeled by an administrator with at least one workload type. A workload type corresponds to a category of information within the data/container image. Based on the workload type identified by the storage proxy 214, the data will be directed to be sent to either data auditor 216, 218, or 220. For example, if the data contained patient information from a doctor's office, the data would be pre-tagged with a workload type indicating medical information. The storage proxy 214 would read this information, and determine the information should be handled by data auditor 218 since data auditor 218 was created to deal with healthcare or medical files, while data auditor 220 is used for financial information, and data auditor 216 is used for personal home addresses.

In example system 200, the data auditor 218 will then audit the data and provide the data with a data qualification, such as a compliance indication or a flag. In this example, the data audited receives a compliance indication, and therefore the data auditor 218 indicates to the storage proxy 214 that the data has received a compliance indication and may be stored in the provisioned/created storage unit 224. The storage proxy 214 will store the data into the storage unit 224 in public object storage 208.

In an alternative example, the service broker 206 may read the workload types of the data or the request 204, and direct the appropriate storage proxy to provide the data to the appropriate data auditor 216, 218, 220. In an alternative example, the service broker 206 may directly instruct the appropriate data auditor to retrieve the data from the appropriate storage proxy 212 or 214.

In an alternative example, the storage proxy 212 or 214 may direct more than one data auditors 212 or 214 to retrieve the data in order to have more than one data auditors 212 or 214 audit the data. For example, the workload type could indicate to the storage proxy 214 that the data to be audited is medical billing data. Therefore, the storage proxy 214 may dictate that the data must be audited in both data auditor 218, relating to medical information, as well as data auditor 220, relating to financial information.

Figure 3:
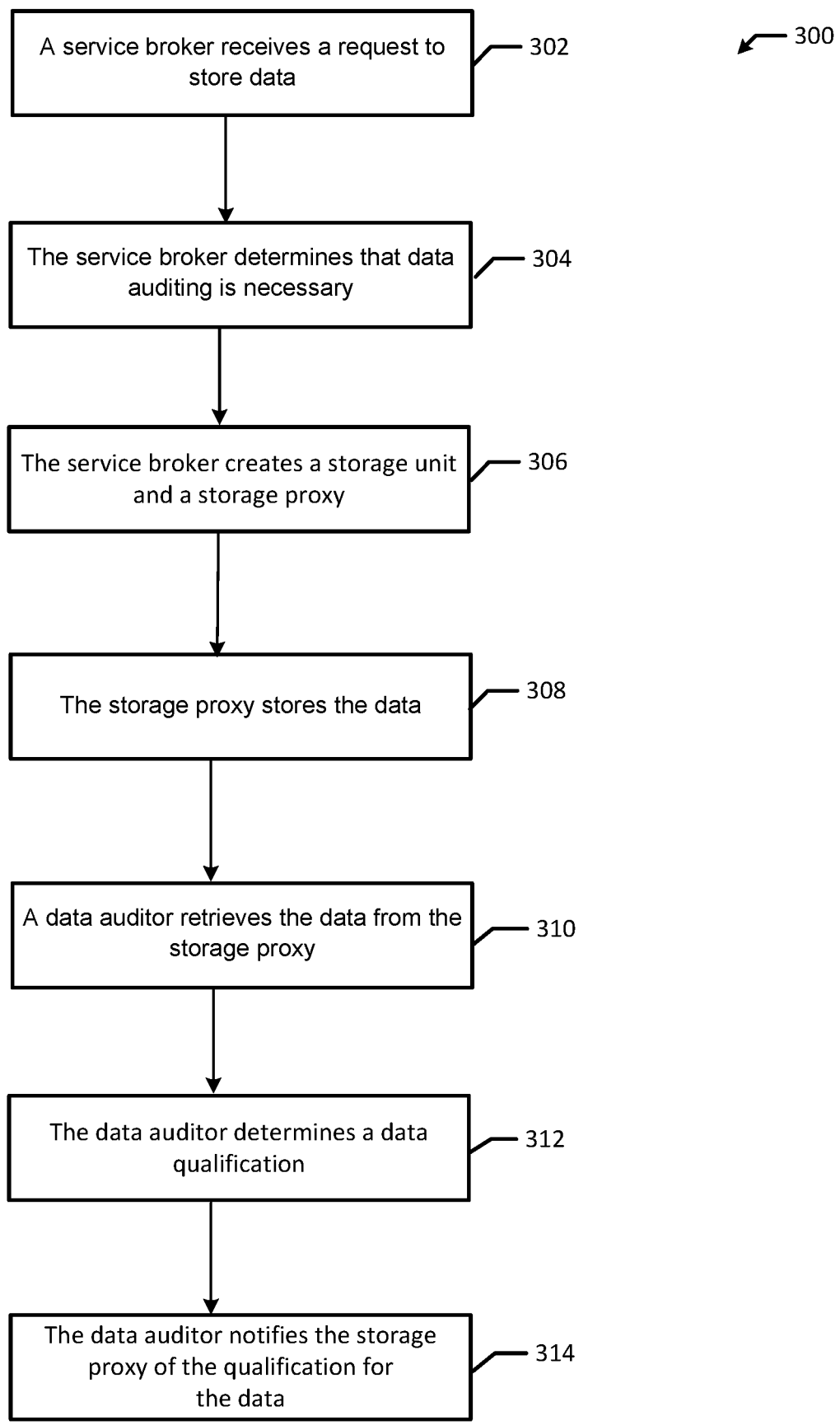
FIG. 3 is a flowchart illustrating an example method for data auditing for object storage public clouds.

FIG. 3 is a flowchart illustrating an example method for data auditing for object storage public clouds. System 300 depicts a flowchart illustrating an example method for data auditing for object storage public clouds. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The method 300 begins by a service broker receiving a request to store data (block 302). For example, an application 128 may send a request to a service broker 132. In an example, the request may be a request to provision or create a storage unit 116 for data. In an alternative example, the request may be a request to store data in the storage unit 116. In an example, the request may be sent automatically by the application 128, or the request could be sent to the service broker 132 by a user of application 128 or an administrator. The request may include a container image of container 122, or user/administrator information of the user/administrator making the request.

Next, the service broker determines that data auditing is necessary (block 304). For example, after receiving the request from application 128, the service broker 132 reads the container image or the user/administrator information and determines whether or not the data to be stored is likely to include sensitive information. For example, if the request includes information about the user of application 128, and the user is a hospital employee, the service broker 132 determines that the request may include sensitive information, such as medical records or patient information. Therefore, the service broker 132 determines data auditing is necessary.

Next, the service broker creates a storage unit and a storage proxy (block 306). For example, the service broker 132 provisions or creates a location for the data to be stored temporarily (storage proxy 130), and provisions some space and creates a storage unit 116 in public object storage 114. Then, the storage proxy stores the data (block 308). For example, the data to be audited is sent from application 128 to storage proxy 130, and storage proxy 130 stores the data.

Next, a data auditor retrieves the data from the storage proxy (block 310). For example, data auditor 134 retrieves the data stored in storage proxy 130 in order to audit the data. Then, the data auditor determines a data qualification (block 312). For example, data auditor 134 reads the data retrieved from the storage proxy 130, and determines the data's compliance indication. For example, an administrator may have preconfigured the data auditor 134 with rules to determine whether the data is safe to store in public object storage 114. Based on these preconfigured rules, the data auditor 134 determines a data qualification for the data. The qualification can be a flag, meaning the data is not safe to store in public object storage 114 because it contains sensitive or private information. The qualification can also be a compliance indication, meaning the data is safe to store in public object storage 114 because it complies with privacy requirements expected to be complied with before information is stored or disseminated. For example, the privacy requirements to be complied with may be imposed by state and/or federal rules and regulations, customer requirements, self-imposed privacy requirements, etc.

Next, the data auditor notifies the storage proxy of the qualification for the data (block 314). For example, the data auditor 134 communicates to the storage proxy 130 the data qualification (flag or compliance indication) that was assigned to the data. The storage proxy 130 handles the data based on the data qualification provided by the data auditor 134. For example, if the data qualification is a flag, the storage proxy 130 handles the data appropriately to ensure that the data does not get stored in the storage unit 116.

Figure 4A:
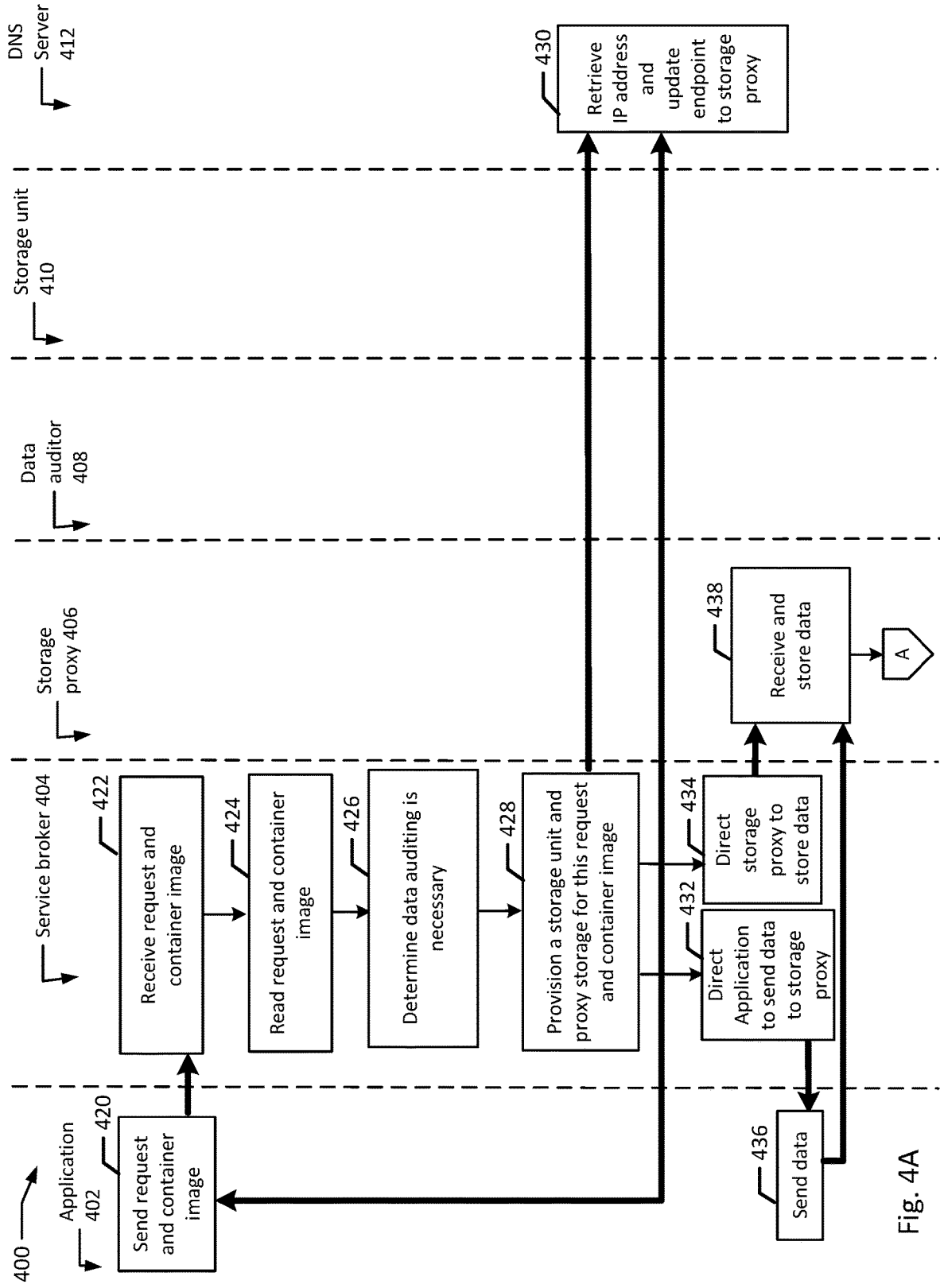
FIG. 4A is a flow diagram illustrating example methods of operating a system for data auditing for object storage public clouds.
Figure 4B:
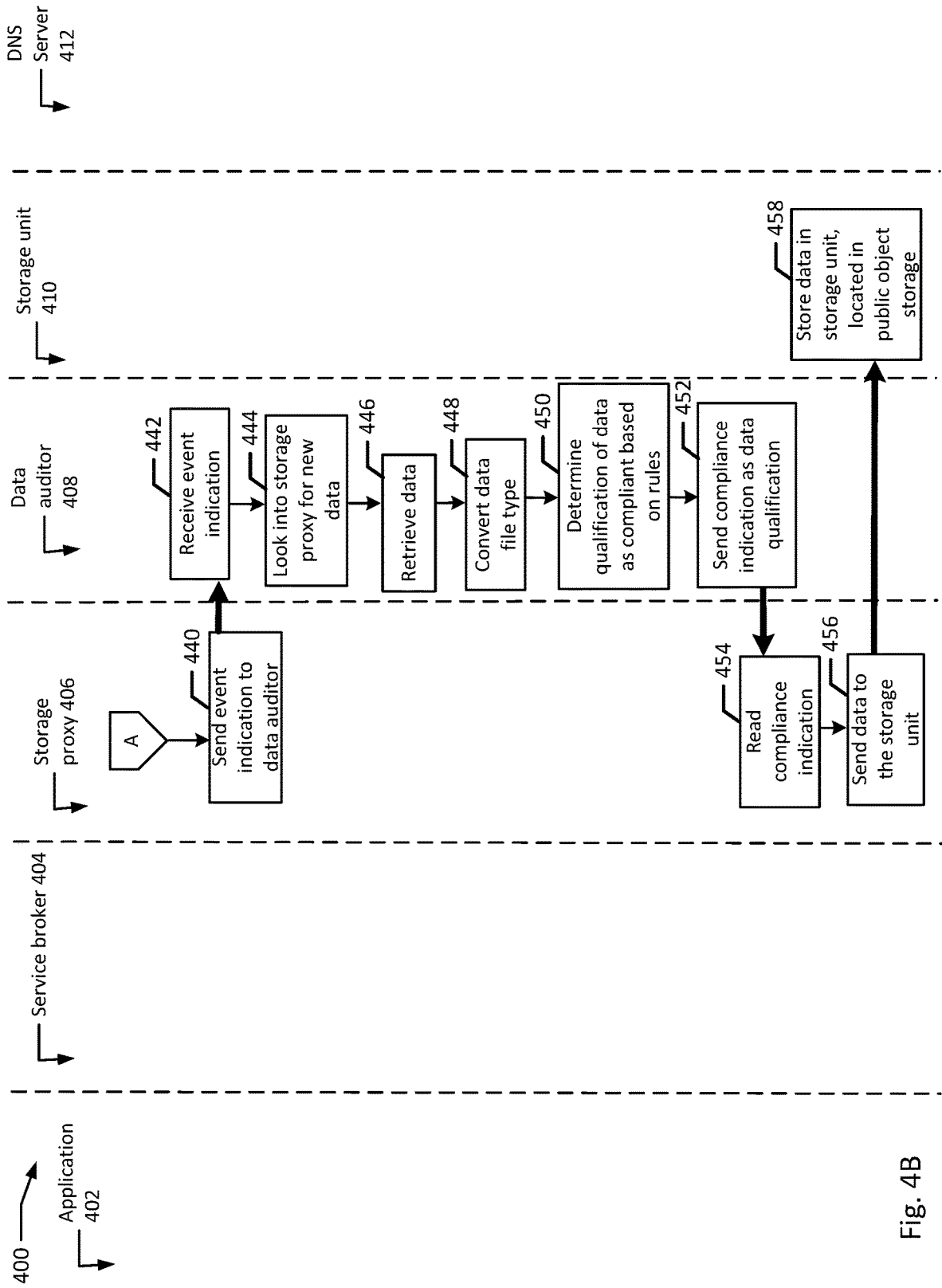
FIG. 4B is a flow diagram illustrating example methods of operating a system for data auditing for object storage public clouds.

FIGS. 4A to 4B illustrate a flowchart of an example method 400 for data auditing for object storage public clouds. Although the example method 400 is described with reference to the flowchart illustrated in FIGS. 4A to 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including an application 402, a service broker 404, a storage proxy 406, a data auditor 408, a storage unit 410, and a DNS server 412.

In the illustrated example, an application 402 sends a request, as well as a container image, to the service broker 404 (block 420). The service broker 404 receives the request and the container image (block 422), reads the request and container image (block 424), and determines that data auditing is necessary (block 426). In an alternative example, the service broker 404 could determine that data auditing is necessary based on an administrator labeling the request or the container image with a type of data, or by reading the type of data in the container image and determining that auditing is necessary.

The service broker 404 then provisions or creates both a storage unit 410 and a storage proxy 406 for the data (block 428). At this time, the service broker 404 informs the DNS server 412 to retrieve the IP address from the application 402 associated with the data in order to update the endpoint to be the storage proxy 406 rather than the storage unit 410 (block 430). As an alternative example, the DNS server could already have the IP addresses associated with the data stored, and therefore can automatically update the endpoint to the storage proxy 406 without asking the application 402 for the IP address.

Next, the service broker 404 directs the application 402 to send data to the storage proxy (block 432), and the application 402 sends the data to the storage proxy 406 (block 436). Either simultaneously or sequentially, the service broker 404 directs the storage proxy 406 to store the data (block 434), and the storage proxy 406 receives and stores the data (block 438).

Once the storage proxy 406 has received the data, the storage proxy 406 sends an event indication to the data auditor 408 indicating that new data has been stored in the storage proxy 406 (block 440), and data auditor 408 receives that event indication (block 442), looks into the storage proxy 406 for the new data (block 444), and retrieves the data (block 446). Alternatively, in another example, the data auditor 408 may periodically conduct a full scale scan of storage proxy 406 in order to determine if any new data has been stored in the storage proxy 406, and if new data has been stored in the storage proxy 406, then the data auditor 408 retrieves the new data.

Next, the data auditor 408 converts the file type (block 448). For example, if the data retrieved by the data auditor 408 is in the form of a PDF, and the data auditor 408 is only able to read the data in txt format, the data auditor 408 converts the data file type to txt format before it reads the data.

Next, the data auditor 408 determines the qualification for the data as a compliance indication based on rules (block 450). In an example, these rules may be preconfigured by an administrator. Next, the data auditor sends the compliance indication as the data qualification to the storage proxy 406 (block 452), and the storage proxy 406 reads this compliance indication from the data auditor (block 454), and sends the data to be stored in the storage unit 410 (block 456). The data is then stored in public object storage in storage unit 410 (block 458).

Alternatively, for example, if data auditor 408 determines that the data qualification is a flag, the data auditor sends the flag indication to the storage proxy 406, and storage proxy 406 sends an alert notification to either the user of the application 402, the application 402, or an administrator. Further, the storage proxy 406 will not send the data to be stored in storage unit 410. The above method is advantageous in that sensitive information is filtered out from being transmitted into or stored in public object storage. This includes an additional safeguard to customers that sensitive information will never be placed into the cloud, where it might be lost or stolen, and allows enterprises the ability to comply with strict privacy requirements regarding sensitive information.

Figure 5:
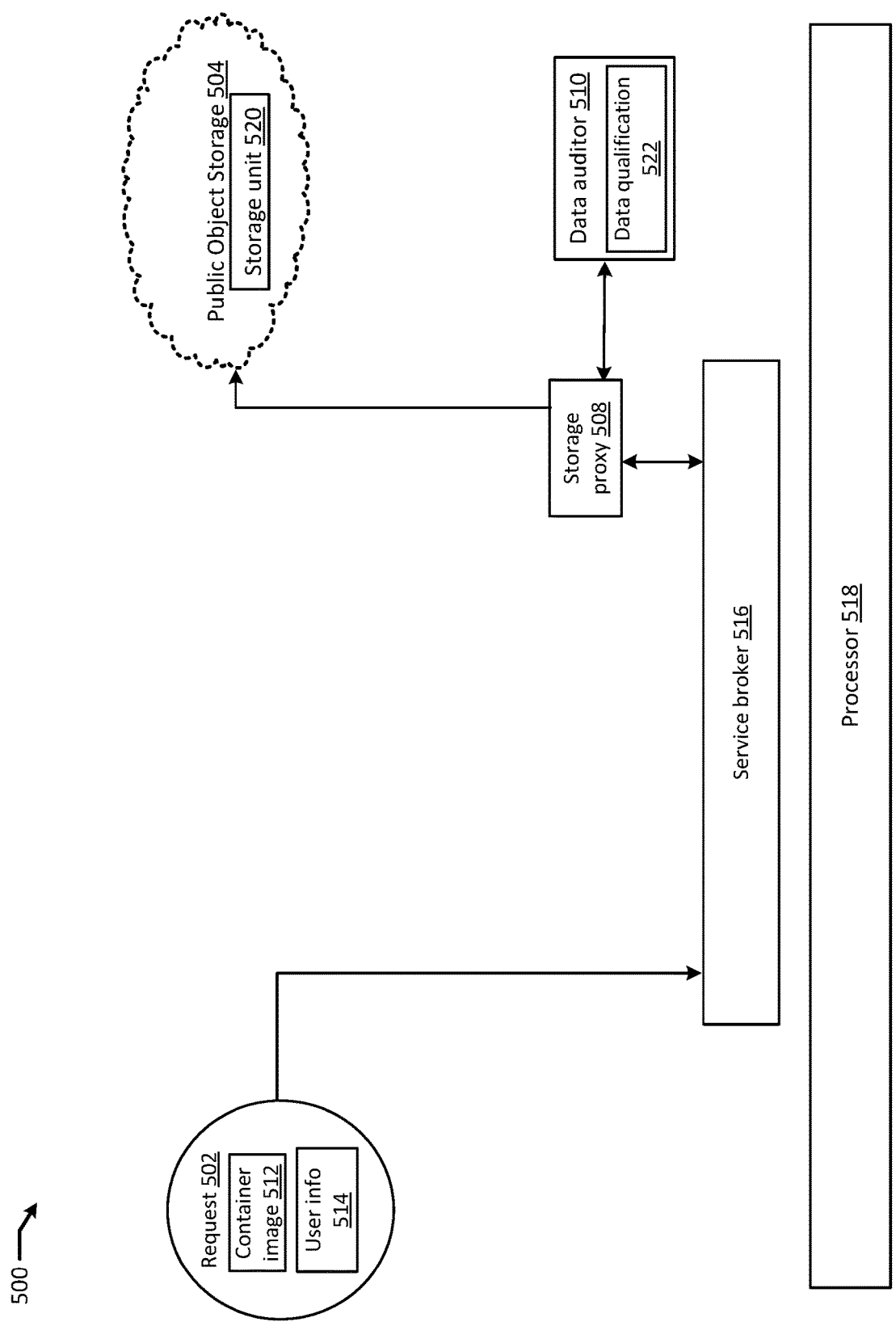
FIG. 5 is a block diagram of an example public storage system according to an example of the present disclosure.

FIG. 5 is a block diagram of an example public storage system according to an example of the present disclosure. As illustrated in FIG. 5, an example system 500 may include a service broker 516, a storage proxy 508, a data auditor 510, and processor 518.

The example system further includes request 502. The request 502 may include a container image 512 and user information 514. The example system further includes public object storage 504. Public object storage 504 may include a storage unit 520.

In an example, the request 502, including container image 512 and user information 514, is sent to the service broker 516. The request 502 may be a request to store data in public object storage 504. In an example, the service broker 516 determines whether the data, based on the request 502, needs data auditing. In an example, if the service broker 516 determines data auditing is necessary, the service broker 516 creates storage proxy 508 and storage unit 520. The service broker 516 may direct the data to be stored in storage proxy 508.

In an example, the data is retrieved by the data auditor 510 from the storage proxy 508. The data auditor 510 determines a data qualification 522 for the data, and notifies the storage proxy 508 of the data qualification 522 to ensure that only the correct data is sent into the public object storage 504, and data that should not be sent is prevented from being placed on the public object storage 504 where it would be at a higher security risk than is acceptable.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
receiving, at a service broker, a request to store data in a public storage which includes at least one of (i) a block storage in which files are split into evenly sized blocks of data, and (ii) an object storage in which data is stored in objects in a flat structure, wherein the request includes at least one of user information and a container image;
determining, by the service broker, that based on the at least one of user information and the container image that data auditing is necessary;
creating, by the service broker, a storage unit in the object storage and a storage proxy;
storing, in the storage proxy, the data;
retrieving, by a data auditor, the data from the storage proxy;
determining, by the data auditor, a data qualification; and
notifying, by the data auditor, the storage proxy of the data qualification.

2. The method of claim 1, wherein the data qualification is a compliance indication.

3. The method of claim 2, further comprising:
sending the data, by the storage proxy, to the storage unit.

4. The method of claim 2, further comprising:
sending storage unit credentials, by the service broker, to a user application, wherein the storage unit credentials include instructions for the user application to access the storage unit.

5. The method of claim 1, wherein the data qualification is a flag, and wherein the flag indicates that the data includes information that should not be stored in the storage unit.

6. The method of claim 5, further comprising:
sending, by the storage proxy, a notification of noncompliance to at least one of an administrator and an application.

7. The method of claim 5, further comprising:
stopping, by the storage proxy, the data from being sent to the storage unit.

8. The method of claim 1, further comprising:
updating, by the service broker, an endpoint for the data in a DNS server to be the storage proxy.

9. The method of claim 1, wherein the request is sent by a user of an application.

10. The method of claim 1, wherein the request is automatically sent by an application.

11. The method of claim 1, further comprising:
labeling, by an administrator, the container image with at least one workload type, wherein the at least one workload type corresponds to a category of information within the container image.

12. The method of claim 11, wherein the workload type is at least one of financial information, medical records, credit card numbers, banking information, telephone numbers, data mining information, email addresses, personal home addresses, personal records, relationship information, and source code.

13. The method of claim 11, further comprising:
reading, by the storage proxy, the workload type; and
sending, by the storage proxy, the data to a first data auditor of a plurality of data auditors.

14. The method of claim 1, further comprising:
preconfiguring, by an administrator, rules within the data auditor, wherein the rules determine the data qualification.

15. The method of claim 1, further comprising:
monitoring, by the storage proxy, the data to ensure that data stored within the storage proxy reflects data updates.

16. A system comprising:
one or more processors;
memory storing instructions configured to execute on the one or more processors;
a storage unit;
a storage proxy;
a data auditor; and
a service broker executing on the one or more processors, wherein the service broker is configured to:
receive a request to store data in a public storage which includes at least one of (i) a block storage in which files are split into evenly sized blocks of data, and (ii) an object storage in which data is stored in objects in a flat structure, wherein the request includes at least one of user information and a container image,
determine that data auditing is necessary based on the at least one of user information and the container image, and
create the storage unit in the object storage and the storage proxy,
wherein the storage proxy is configured to:
store the data, and
wherein the data auditor is configured to:
retrieve the data from the storage proxy,
determine a data qualification, and
notify the storage proxy of the data qualification.

17. The system of claim 16, wherein the data qualification is at least one of a compliance indication or a flag.

18. The system of claim 17, wherein the storage proxy reads a workload type from the container image, and sends the data to a first data auditor of a plurality of data auditors.

19. The system of claim 17, wherein the storage unit is a bucket.

20. A non-transitory machine readable medium storing instruction, which when executed by one or more physical processors, is configured to:
receive, at a service broker, a request to store data in a public storage which includes at least one of (i) a block storage in which files are split into evenly sized blocks of data, and (ii) an object storage in which data is stored in objects in a flat structure, wherein the request includes at least one of user information and a container image;
determine, by the service broker, that based on the at least one of the user information and the container image that data auditing is necessary;
create, by the service broker, a storage unit in the object storage and a storage proxy;
store, in the storage proxy, the data;
retrieve, by a data auditor, the data from the storage proxy;
determine, by the data auditor, a data qualification; and
notify, by the data auditor, the storage proxy of the data qualification.

* * * * *